United States Patent
Jiang (10) Patent No.: US 11,404,985 B2
(45) Date of Patent: Aug. 2, 2022

(54) MOTOR CONTROL METHOD AND DEVICE, AND FREQUENCY CONVERSION CONTROLLER

(71) Applicant: Hangzhou Leaderway Electronics Co., Ltd., Zhejiang (CN)

(72) Inventor: Dekai Jiang, Zhejiang (CN)

(73) Assignee: Hangzhou Leaderway Electronics Co., Ltd., Zhejiang (CN)

( * ) Notice: Subject to any disclaimer, the term of this patent is extended or adjusted under 35 U.S.C. 154(b) by 0 days.

(21) Appl. No.: 17/253,572

(22) PCT Filed: Sep. 12, 2019

(86) PCT No.: PCT/CN2019/105541
§ 371 (c)(1),
(2) Date: Dec. 17, 2020

(87) PCT Pub. No.: WO2020/057427
PCT Pub. Date: Mar. 26, 2020

(65) Prior Publication Data
US 2021/0175829 A1    Jun. 10, 2021

(30) Foreign Application Priority Data

Sep. 20, 2018  (CN) .......................... 201811102178.1

(51) Int. Cl.
H02P 21/22    (2016.01)
H02P 21/18    (2016.01)
(Continued)

(52) U.S. Cl.
CPC ............... *H02P 21/22* (2016.02); *H02H 9/02* (2013.01); *H02P 21/0003* (2013.01);
(Continued)

(58) Field of Classification Search
CPC .......... H02P 21/22; H02P 21/18; H02P 21/20; H02P 21/0003; H02P 2205/01;
(Continued)

(56) References Cited

U.S. PATENT DOCUMENTS 6,657,413 B2 * 12/2003 Nakatsugawa ........... H02P 6/06
                                                          318/700
2008/0191656 A1 * 8/2008 Satake ................ B60L 15/2045
                                                          318/722
(Continued)

FOREIGN PATENT DOCUMENTS

| CN | 1954486 A    | 4/2007 |
| CN | 102163943 A  | 8/2011 |

(Continued)

OTHER PUBLICATIONS

International Search Report and Written Opinion for International Application No. PCT/CN2019/105541, dated Dec. 18, 2019.

(Continued)

*Primary Examiner* — Bickey Dhakal
(74) *Attorney, Agent, or Firm* — Wolf, Greenfield & Sacks, P.C.

(57) ABSTRACT

Provided are a motor control method, a motor control device and a variable frequency drive. The method includes: performing an amplitude limiting on a command torque to obtain a target torque; calculating a target current based on the target torque; determining whether an amplitude of the target current is greater than a current limiting amplitude; performing an amplitude limiting on current components of the target current, when the amplitude of the target current is greater than the current limiting amplitude; and controlling a motor based on the current components of the target current after being performed the amplitude limiting. Thus, (Continued)

an amplitude limiting on current of a motor is achieved by performing amplitude limiting on torque and current.

19 Claims, 4 Drawing Sheets

(51) Int. Cl.
    *H02P 21/20*     (2016.01)
    *H02P 9/02*     (2006.01)
    *H02P 21/00*     (2016.01)
    *H02H 9/02*     (2006.01)

(52) U.S. Cl.
    CPC .............. *H02P 21/18* (2016.02); *H02P 21/20* (2016.02); *H02P 2205/01* (2013.01); *H02P 2205/07* (2013.01)

(58) Field of Classification Search
    CPC .... H02P 2205/07; H02P 2205/05; H02P 6/08; H02P 27/04
    See application file for complete search history.

(56) References Cited

U.S. PATENT DOCUMENTS

| | | | |
|---|---|---|---|
| 2010/0052581 A1 | 3/2010 | Izumi et al. | |
| 2013/0009574 A1* | 1/2013 | Yoo | H02P 21/22 318/400.02 |
| 2020/0091850 A1* | 3/2020 | Endoh | H02P 29/032 |

FOREIGN PATENT DOCUMENTS

| | | | | |
|---|---|---|---|---|
| CN | 104242767 A | | 12/2014 | |
| CN | 105811827 A | | 7/2016 | |
| CN | 106160589 A | | 11/2016 | |
| CN | 108429503 A | | 8/2018 | |
| CN | 108667374 A | * | 10/2018 | .......... H02P 21/0089 |
| EP | 2 362 536 A2 | | 8/2011 | |
| WO | WO-9215148 A1 | * | 9/1992 | ............. H02P 21/20 |

OTHER PUBLICATIONS

First Office Action for Chinese Application No. 201811102178.1, dated Feb. 1, 2021.

* cited by examiner

Figure 4

MOTOR CONTROL METHOD AND DEVICE, AND FREQUENCY CONVERSION CONTROLLER

This application is the national phase of International Application No. PCT/CN2019/105541, titled "MOTOR CONTROL METHOD AND DEVICE, AND FREQUENCY CONVERSION CONTROLLER", filed on Sep. 12, 2019, which claims priority to Chinese Patent Application No. 201811102178.1, titled "MOTOR CONTROL METHOD AND DEVICE, AND VARIABLE FREQUENCY DRIVE", filed on Sep. 20, 2018 with the China National Intellectual Property Administration (CNIPA). The contents of these applications are incorporated herein by reference in their entireties.

FIELD

The present disclosure relates to the technical field of motor control, and in particular to a motor control method, a motor control device, and a variable frequency drive.

BACKGROUND

In recent years, with the continuous improvement of energy-saving requirements, there is an increasing demand for variable frequency or variable speed control of a motor. A field-oriented control (FOC) algorithm is commonly used for a variable frequency control of a motor. In order to maintain the stability and reliability of a system, a current limited control based on a current is an important protection function.

SUMMARY

In view of this, a motor control method, a motor control device and a variable frequency drive are provided in the present disclosure, so as to realize a current limiting control of a motor.

To solve the above technical problems, technical solutions are provided in the present disclosure as follows.

A motor control method comprises the following steps:
performing an amplitude limiting on a command torque to obtain a target torque;
calculating a target current based on the target torque;
determining whether an amplitude of the target current is greater than a current limiting amplitude;
performing an amplitude limiting on current components of the target current, when the amplitude of the target current is greater than the current limiting amplitude; and
controlling a motor based on the current components of the target current after being performed the amplitude limiting.

A motor control device comprises:
a torque amplitude limiting module, configured to perform an amplitude limiting on a command torque to obtain a target torque;
a target current calculation module, configured to calculate a target current based on the target torque;
a determination module, configured to determine whether an amplitude of the target current is greater than a current limiting amplitude;
a current amplitude limiting module, configured to perform an amplitude limiting on current components of the target current, when the amplitude of the target current is greater than the current limiting amplitude; and
a motor control module, configured to control a motor based on the current components of the target current after being performed the amplitude limiting.

A variable frequency drive is configured to control a motor and comprises the motor control device described above.

A motor control method, a motor control device and a variable frequency drive are provide in embodiments of the present disclosure. Firstly, an amplitude limiting is performed on a command torque to obtain a target torque, and then a target current is calculated based on the target torque. After an amplitude limiting determination is performed on the target current, the amplitude limiting is performed. Finally, a motor is controlled based on current components after being performed the amplitude limiting, to realize current limiting control of the motor.

BRIEF DESCRIPTION OF THE DRAWINGS

In order to more clearly illustrate technical solutions according to embodiments of the present disclosure or according to the conventional technology, drawings to be used in the description of embodiments or the conventional technology will be described briefly as follows. It is apparent that the drawings in the following description only show some embodiments of the present disclosure. For those skilled in the art, other drawings may be obtained according to these drawings without any creative work.

DETAILED DESCRIPTION

Technical solutions in embodiments of the present disclosure are described clearly and completely hereinafter in conjunction with the drawings of the embodiments of the present disclosure. Apparently, the embodiments described herein are only a part rather than all of the embodiments of the disclosure. All other embodiments obtained by those skilled in the art based on the embodiments of the present disclosure without any creative efforts fall within the protection scope of the present disclosure.

Figure 1:
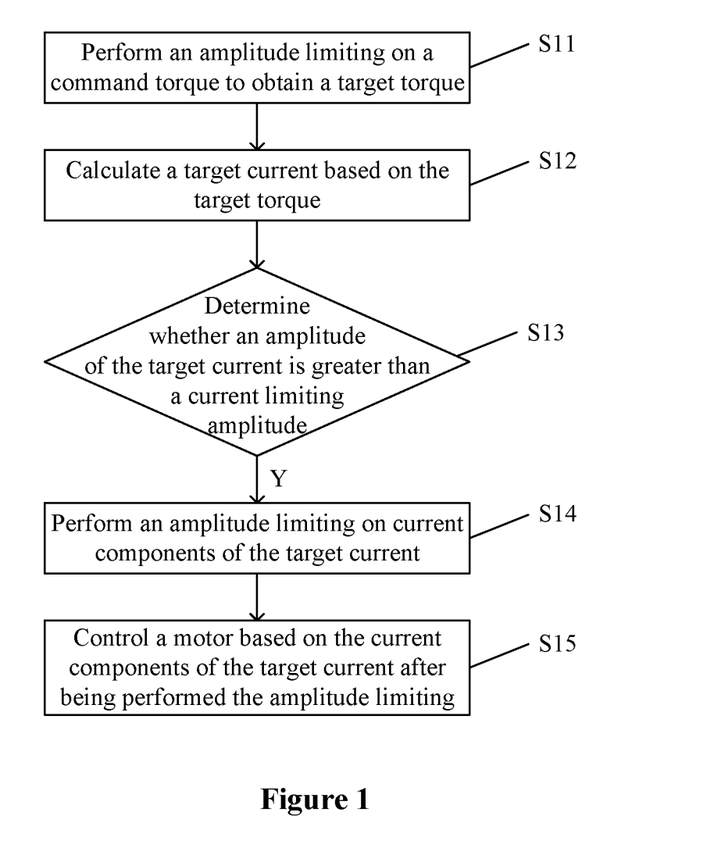
FIG. 1 is a flow chart of a motor control method according to an embodiment of the present disclosure.

A motor control method is provided in an embodiment of the present disclosure. As shown in FIG. 1, the method includes steps S11 to S15.

In step S11, an amplitude limiting is performed on a command torque Ti to obtain a target torque T*.

In step S12, a target current Ig is calculated based on the target torque T*, where the target current Ig represents a driving current of a motor.

In step S13, it is determined whether an amplitude of the target current is greater than a current limiting amplitude I max, where the current limiting amplitude I max is set by a system such as a host computer. When the target current is greater than the current limiting amplitude I max, it is required to perform a frequency limiting or a frequency reduction, and after the frequency limiting or the frequency reduction is performed on the motor, the target current will be reduced, so as to realize a current-limiting protection.

In step S14, when the amplitude of the target current is greater than the current limiting amplitude, an amplitude limiting is performed on current components of the target current, where the current components may include a q-axis current component and a d-axis current component.

In step S15, the motor is controlled based on the current components of the target current after being performed the amplitude limiting.

The command torque Ti is a torque generated by a system such as a host computer based on a preset value and a feedback value of the motor. And the command torque Ti is outputted by the host computer to make parameters for driving the motor meet a preset requirement. The preset value may be a target motor speed, and the feedback value of the motor may be a feedback value of the motor speed. Alternatively, in a constant torque control mode, the command torque Ti is set by the system such as the host computer. In some cases, for example, a load is increased or an input voltage is reduced, overcurrent may occur at this time if it is blind to make the parameters for driving the motor meet the preset requirement. Therefore, a stable motor drive system or a controller needs to not only take into account whether actual parameters of the motor meet the preset requirements, but also realize a current-limiting protection function, to avoid frequent overcurrent and shutdown. A motor control method is provided in an embodiment of the present disclosure, so as to realize frequency limiting protection or frequency reduction protection when a current reaches a limiting current, while the current-limiting protection function will not affect the parameters for driving the motor to meet the preset requirements when the motor is in a normal operation, which prevents the overcurrent protection from being frequently performed.

Figure 2:
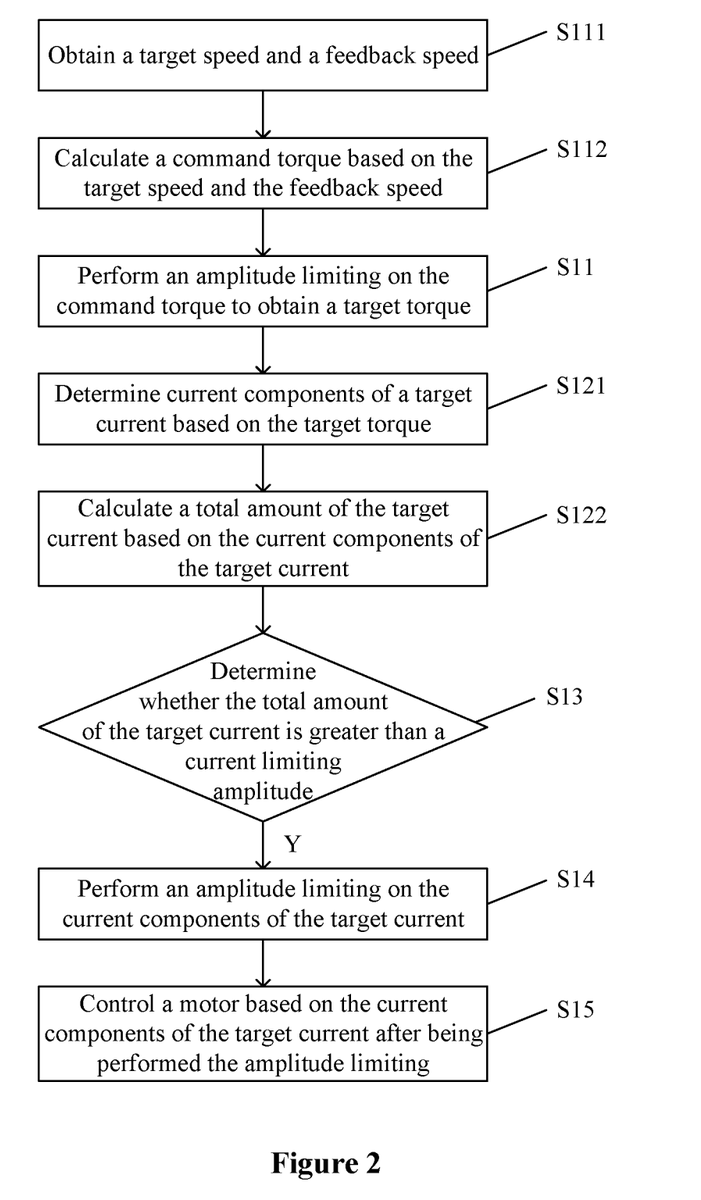
FIG. 2 is a flow chart of a motor control method according to another embodiment of the present disclosure.

Based on the above embodiment, a motor control method is further provided in another embodiment of the present disclosure. As shown in FIG. 2, before the step S11 in which an amplitude limiting is performed on a command torque Ti to obtain a target torque T*, the method further includes steps S111 and S112.

In step S111, a target speed $\omega^*$ and a feedback speed $\omega_f$ are obtained, where the target speed $\omega^*$ is set by a system such as a host computer, and the feedback speed $\omega_f$ is an actual running speed of the motor.

In step S112, the command torque Ti is calculated based on the target speed $\omega^*$ and the feedback speed $\omega_f$.

In another embodiment, the step S12 in which a target current is calculated based on the target torque T* includes steps S121 and S122.

In step S121, current components of the target current Ig are obtained based on the target torque T*.

In step S122, a total amount Is of the target current is calculated based on the current components of the target current Ig.

Figure 3:
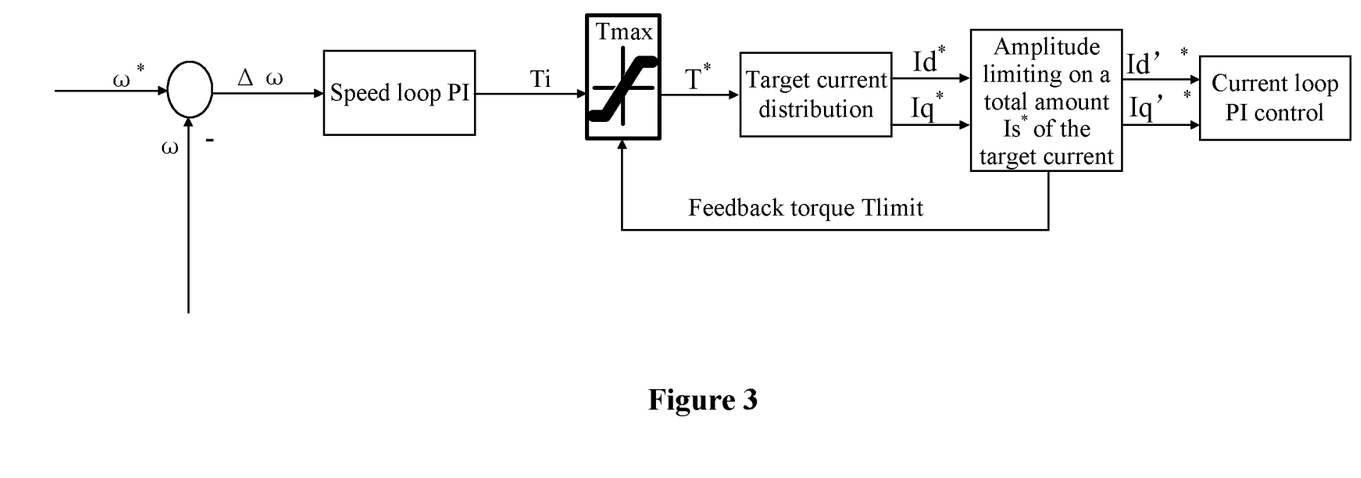
FIG. 3 is a schematic diagram of a motor frequency control loop according to an embodiment of the present disclosure.

In this embodiment, the step S13 of determining whether an amplitude of the target current is greater than a current limiting amplitude I max includes determining whether an amplitude of the total amount of the target current is greater than the current limiting amplitude I max. In order to further explain the control principal, FIG. 3 shows a schematic diagram of a motor frequency control loop according to an embodiment of the present disclosure. In the embodiment of the present disclosure, a maximum current of the motor is limited depending on a fast response of a current loop, thus realizing frequency limiting or frequency reduction of the motor speed and hence reducing the motor current, to realize the current limiting protection.

In the above embodiment, the step S121 comprises specifically: obtaining a d-axis current component Id* and a q-axis current component Iq* of the target current based on the target torque T*, that is, the current components of the target current include the d-axis current component Id* and the q-axis current component Iq*. The distribution may be based on a preset angle between the target current and the q/d-axis, or the distribution may be based on other ways, which is not limited in the present disclosure.

The step S122 comprises specifically: calculating an amplitude |Is| of the total amount Is of the target current based on the current components of the target current, where $|Is|=\sqrt{Id^{*2}+Iq^{*2}}$.

The step S13 of determining whether an amplitude of the target current is greater than a current limiting amplitude I max includes: determining whether an amplitude of the total amount of the target current is greater than the current limiting amplitude I max, that is, determining whether |Is| is greater than I max. In this embodiment, performing an amplitude limiting on the current components of the target current refers to performing the amplitude limiting on the q-axis current component and the d-axis current component, and specifically includes the following steps.

It is determined whether the q-axis current component Iq* is greater than or equal to the current limiting amplitude I max. If the q-axis current component Iq* is greater than or equal to the current limiting amplitude I max, the q-axis current component Iq'* is set to be equal to the current limiting amplitude I max, and the d-axis current component Id'* is set to be equal to 0, that is, Iq'*=I max, Id'*=0.

If the q-axis current component Iq* is less than the current limiting amplitude I max, the q-axis current component Iq'* is kept unchanged, that is, Iq'*=Iq*, and the d-axis current component Id'* is set to be equal to a square root of a square difference between the current limiting amplitude I max and the q-axis current component Iq'*, that is, $Id'^* = \sqrt{Imax^2 - Iq'^{*2}}$.

Where Iq'* and Id'* represent the q-axis current component and the d-axis current component after being performed the amplitude limiting, respectively.

It should be noted that, in the present disclosure, the current component represents the current amplitude, and the q-axis current component and the d-axis current component represent a q-axis current amplitude and a d-axis current amplitude respectively.

In this embodiment, a requirement of a q-axis current is met preferentially, to ensure the torque for driving the motor. While in another embodiment, a requirement of a d-axis current may also be met preferentially, to ensure a magnetic force of the motor. In this embodiment, the amplitude |Is| of the total amount of the target current is still equal to a square root of a square sum of the d-axis current component Id* and the q-axis current component Iq*, that is, $|Is|=\sqrt{Id^{*2}+Iq^{*2}}$.

The step S14 of performing an amplitude limiting on current components of the target current includes the following steps.

It is determined whether the d-axis current component Id* is greater than or equal to the current limiting amplitude I max; if the d-axis current component Id* is greater than or equal to the current limiting amplitude I max, the d-axis current component Id'* after being performed the amplitude limiting is set to be equal to the current limiting amplitude I max, and the q-axis current component Iq'* is set to be equal to 0, that is, Id'*=I max, Iq'*=0.

If the d-axis current component Id* is less than the current limiting amplitude I max, the d-axis current component Id'* is kept unchanged, that is, Id'=Id*, and the q-axis current component Iq'* is set to be equal to a square root of a square difference between the current limiting amplitude I max and the d-axis current component Id'*, that is, $Iq'* = \sqrt{Imax^2 - Id'^{*2}}$.

Where Iq'* and Id'* represent the q-axis current component and the d-axis current component after being performed the amplitude limiting, respectively.

In addition to the embodiments above, another embodiment is further provided in the present disclosure. In the embodiment, the step S12 of calculating a target current based on the target torque includes: calculating the total amount Is of the target current and a component angle θ based on the target torque, where the component angle θ is an angle between the total amount Is of the target current and the d-axis.

The step S13 of determining whether an amplitude of the target current is greater than a current limiting amplitude includes: determining whether the total amount Is of the target current is greater than the current limiting amplitude I max, that is, comparing |Is| with I max.

The performing an amplitude limiting on the current components of the target current includes:

Setting the q-axis current component Iq'* of the target current after being performed the amplitude limiting according to an equation Iq'=I max*sin θ; and Setting the d-axis current component Id* of the target current after being performed the amplitude limiting according to an equation Id'=I max*cos θ.

Furthermore, a motor control method is further provided in an embodiment of the present disclosure. After entering the current amplitude limiting and performing the amplitude limiting on the q-axis current component or the d-axis current component of the target current Ig, a feedback torque Tlimit is calculated. The feedback torque Tlimit is equal to 1.5 times of a product of pole pairs P of the motor, a back electromotive force constant Ke and the q-axis current component Iq'*, that is, Tlimit=1.5*P*Ke*Iq'*.

In the embodiment, the step S11 of performing an amplitude limiting on a command torque Ti to obtain a target torque T* may include: comparing the feedback torque Tlimit with a preset torque T max, determining a smaller one between the feedback torque Tlimit and the preset torque T max as a maximum amplitude of the command torque Ti, and setting the command torque Ti after being performed the amplitude limiting as the target torque T*, as shown in FIG. 3. T max is preset by a system, such as a host computer based on information such as driving parameters, working condition information or protection information of the motor, or the like.

In another embodiment, the step S112 of calculating the command torque Ti based on the target speed ω* and the feedback speed $ω_f$ includes:

calculating a difference Δω between the target speed ω* and the feedback speed $ω_f$, and calculating the command torque Ti by a speed loop PI algorithm based on the difference ΔΩ and the target speed ω*.

The step S15 of controlling the motor based on the current components of the target current after being performed the amplitude limiting includes: performing a current loop control based on the current components of the target current after being performed the amplitude limiting. The target current may include information such as an amplitude of the target current, a q-axis current or a d-axis current. Therefore, specifically, the current loop control is performed on the motor, based on the q-axis current component or the d-axis current component of the target current after being performed the amplitude limiting.

In order to further explain advantages of the technical solution of the present disclosure, a motor control method according to the conventional technology is described below. In the method, a frequency limiting or a frequency reduction is performed based on a motor current, so as to realize an over-current protection. The method generally includes the following steps 1 to 4.

In step 1, the motor does not entered to a protection mode and the motor runs freely, in a case that an actual running current Irun of the motor is less than Ihold.

In step 2, the motor enters to a frequency limiting protection and runs at a current speed, in a case that the actual running current Irun of the motor is greater than or equal to Ihold and less than Idown.

In step 3, the motor enters to a frequency reduction protection and performs a frequency reduction operation with an acceleration acc until Irun is less than Idown, in a case that the actual running current Irun of the motor is greater than or equal to Idown and less than Istop.

In step 4, the motor stops and reports an error, in a case that the actual running current Irun of the motor is greater than Istop.

Where, Ihold<Idown<Istop.

In this method, due to a slow response speed, a respond cannot be made in time in a case of rapid load change, which easily causes an over-current shutdown protection. Moreover, it is required to do a large number of experiments to determine Ihold, Idown, Istop and acc, otherwise, it is easy to cause an oscillation of the motor's operating frequency, result in instability of the motor speed and reduce the reliability of control.

Compared with the above motor control method according to the conventional technology, the motor control method according to the embodiment of the present disclosure has the following advantages.

1) The maximum value of the motor current can be limited quickly, so as to limit or reduce the motor frequency quickly.

2) There will be no speed oscillation upon frequency limiting or frequency reduction, so that the speed can be stabilized to a lower speed.

3) Noise is avoided upon frequency limiting or frequency reduction.

Figure 4:
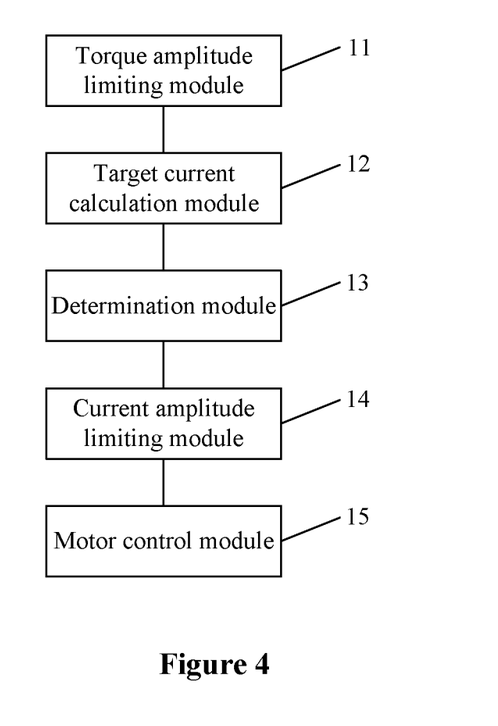
FIG. 4 is a schematic block diagram of a motor control device according to an embodiment of the present disclosure

Based on the above motor control method according to the embodiments of the present disclosure, a motor control device is further provided in the present disclosure, as shown in FIG. 4. The device includes a torque amplitude limiting module 11, a target current calculation module 12, a determination module 13, a current amplitude limiting module 14 and a motor control module 15.

The torque amplitude limiting module 11 is configured to perform an amplitude limiting on a command torque Ti to obtain a target torque T*.

The target current calculation module 12 is configured to calculate a target current Ig based on the target torque T*.

The determination module 13 is configured to determine whether an amplitude of the target current Ig is greater than a current limiting amplitude I max.

The current amplitude limiting module 14 is configured to perform an amplitude limiting on current components of the target current, when the amplitude of the target current is greater than the current limiting amplitude.

The motor control module 15 is configured to control a motor based on the current components of the target current after being performed the amplitude limiting.

In an embodiment, a command torque Ti is calculated based on a target speed $\omega^*$ and a feedback speed $\omega_f$, and the motor control device further includes:

a torque acquisition module, configured to obtain the target speed $\omega^*$ and the feedback speed $\omega_f$; and a command torque calculation module, configured to calculate the command torque Ti based on the target speed $\omega^*$ and the feedback speed $\omega_f$. For example, a difference $\Delta\omega$ between the target speed $\omega^*$ and the feedback speed $\omega_f$ is calculated first, and the command torque Ti is calculated by a speed loop PI algorithm based on the difference $\Delta\omega$ and the target speed $\omega^*$.

The current components of the target current include a d-axis current component Id* and a q-axis current component Iq*. A total amount Is of the target current is equal to a square root of a square sum of the d-axis current component Id* and the q-axis current component Iq*, that is, $|Is|=\sqrt{Id^{*2}+Iq^{*2}}$.

The above determination module 13 is configured to determine whether the total amount Is of the target current is greater than the current limiting amplitude I max. The current amplitude limiting module 14 includes:

a q-axis current component determination unit, configured to determine whether the q-axis current component Iq* is greater than or equal to the current limiting amplitude I max; and a first current component calculation unit, configured to: set a q-axis current component Iq'* to be equal to the current limiting amplitude I max, and set a d-axis current component Id'* to be equal to 0, when the q-axis current component is greater than or equal to the current limiting amplitude; Or, configured to: keep the q-axis current component Iq'* unchanged, that is, Iq'*=Iq*, and set the d-axis current component Id'* to be equal to a square root of a square difference between the current limiting amplitude I max and the q-axis current component Iq'*, that is, $Id'^*=\sqrt{Imax^2-Iq'^{*2}}$, when the q-axis current component Iq* is less than the current limiting amplitude I max. The q-axis current component Iq'* and the d-axis current component Id'* are the q-axis current component and the d-axis current component after being performed the amplitude limiting.

In another embodiment, the above current amplitude limiting module 14 may also include:

a d-axis current component determination unit, configured to determine whether the d-axis current component Id* is greater than or equal to the current limiting amplitude I max; and a second current component calculation unit is configured to set a d-axis current component Id'* to be equal to the current limiting amplitude I max, and set the q-axis current component Iq'* to be equal to 0, when the d-axis current component Id* is greater than or equal to the current limiting amplitude; Or the second current component calculation unit is configured to keep the d-axis current component unchanged, that is, Id'=Id*, and set the q-axis current component Iq'* to be equal to a square root of a square difference between the current limiting amplitude and the d-axis current component, that is, $Iq'^*=\sqrt{Imax^2-Id'^{*2}}$, when the d-axis current component Id* is less than the current limiting amplitude I max.

In another embodiment, the target current calculation module 12 is configured to obtain the total amount Is of the target current and a component angle $\theta$ based on the target torque.

The determination module 13 is configured to determine whether the total amount Is of the target current is greater than the current limiting amplitude.

The current amplitude limiting module 14 includes:

a q-axis current calculation unit, configured to set a q-axis current component Iq'* of the target current according to an equation Iq'*=I max*sin $\theta$, when the total amount of the target current is greater than the current limiting amplitude; and a d-axis current calculation unit, configured to set a d-axis current component Id'* of the target current according to an equation Id'*=I max*cos $\theta$, when the total amount of the target current is greater than the current limiting amplitude.

The above motor control device further includes:

a feedback torque calculation module, configured to calculate a feedback torque Tlimit upon entering current amplitude limiting control, where the feedback torque Tlimit is equal to 1.5 times of a product of pole pairs P of the motor, a back electromotive force constant Ke and the q-axis current component Iq'*, that is, Tlimit=1.5*P*Ke*Iq'*.

The torque amplitude limiting module 11 is configured to compare the feedback torque Tlimit with a preset torque T max, and determine a smaller one between the feedback torque Tlimit and the preset torque T max as a maximum amplitude of the command torque. The command torque Ti after being performed the amplitude limiting serves as the target torque T*, as shown in FIG. 3. T max is preset by a system, such as a host computer based on information such as driving parameters, working condition information or protection information of the motor, or the like.

The motor control unit 15 is configured to perform a current loop control based on the current component of the target current after being performed the amplitude limiting. The target current may include information such as an amplitude of the target current, a q-axis current or a d-axis current. Therefore, specifically, the motor control unit 15 is configured to perform the current loop control on the motor based on the q-axis current component or d-axis current component of the target current after being performed the amplitude limiting.

In the above motor control device, a maximum value of the driving current of the motor is limited depending on a fast response of a current loop, thus realizing frequency limiting or frequency reduction of the motor speed.

Based on the above motor control method and the motor control device, a variable frequency drive is further provided in an embodiment of the present disclosure.

The variable frequency drive is configured to control a motor and includes the motor control device according to above embodiments.

The motor control method, the motor control device and the variable frequency drive according to the embodiments of the present disclosure may be widely applied in motor frequency converter control of an air-conditioner, a refrigerator, a washing machine, and in control of other inverter controllers.

Based on the above description of the disclosed embodiments, those skilled in the art may implement or use the present disclosure. It is apparent to those skilled in the art to make various modifications to these embodiments. The general principle defined herein may be applied to other embodiments without departing from the spirit or scope of the present disclosure. Therefore, the present disclosure is not limited to the embodiments described herein, but is to conform to the widest scope in accordance with the principle and novel features disclosed herein.

The invention claimed is:

1. A motor control method, comprising the following steps:
   performing an amplitude limiting on a command torque to obtain a target torque;
   calculating a target current based on the target torque;
   determining whether an amplitude of the target current is greater than a current limiting amplitude;
   performing an amplitude limiting on current components of the target current, when the amplitude of the target current is greater than the current limiting amplitude; and
   controlling a motor based on the current components of the target current after being performed the amplitude limiting,
   wherein the calculating the target current based on the target torque comprises:
   calculating the current components of the target current based on the target torque; and
   calculating a total amount of the target current based on the current components of the target current;
   wherein the determining whether the amplitude of the target current is greater than the current limiting amplitude comprises:
   determining whether an amplitude of the total amount of the target current is greater than the current limiting amplitude.

2. The motor control method according to claim 1, wherein before the performing the amplitude limiting on the command torque to obtain the target torque, the method further comprises:
   obtaining a target speed and a feedback speed; and
   calculating the command torque based on the target speed and the feedback speed.

3. The motor control method according to claim 2, wherein the calculating the command torque based on the target speed and the feedback speed comprises:
   calculating a difference between the target speed and the feedback speed, and calculating the command torque by a speed loop PI algorithm based on the difference and the target speed;
   wherein the controlling the motor based on the current components of the target current after being performed the amplitude limiting comprises:
   performing a current loop control based on the current components of the target current after being performed the amplitude limiting.

4. The motor control method according to claim 1, wherein the current components comprise a d-axis current component and a q-axis current component;
   the amplitude of the total amount of the target current is equal to a square root of a square sum of the d-axis current component and the q-axis current component;
   wherein the performing the amplitude limiting on the current components of the target current comprises:
   determining whether the q-axis current component is greater than or equal to the current limiting amplitude;
   setting the q-axis current component to be equal to the current limiting amplitude and setting the d-axis current component to be equal to 0, when the q-axis current component is greater than or equal to the current limiting amplitude; and
   keeping the q-axis current component unchanged and setting the d-axis current component to be equal to a square root of a square difference between the current limiting amplitude and the q-axis current component, when the q-axis current component is less than the current limiting amplitude;
   alternatively, the performing the amplitude limiting on the current components of the target current comprises:
   determining whether the d-axis current component is greater than or equal to the current limiting amplitude;
   setting the d-axis current component to be equal to the current limiting amplitude and setting the q-axis current component to be equal to 0, when the d-axis current component is greater than or equal to the current limiting amplitude; and
   keeping the d-axis current component unchanged and setting the q-axis current component to be equal to a square root of a square difference between the current limiting amplitude and the d-axis current component, when the d-axis current component is less than the current limiting amplitude.

5. The motor control method according to claim 4, wherein when entering current amplitude limiting, a feedback torque is calculated, and the feedback torque is equal to 1.5 times of a product of pole pairs of the motor, a back electromotive force constant and the q-axis current component.

6. The motor control method according to claim 5, wherein the performing the amplitude limiting on the command torque to obtain the target torque comprises:
   comparing the feedback torque with a preset torque, determining a smaller one between the feedback torque and the preset torque as a maximum amplitude of the command torque, and setting the command torque after being performed the amplitude limiting as the target torque.

7. The motor control method according to claim 1, wherein the calculating the target current based on the target torque further comprises:
   calculating a component angle $\theta$ based on the target torque;
   wherein the performing the amplitude limiting on the current components of the target current comprises:
   setting a q-axis current component $Iq'^*$ of the target current after being performed the amplitude limiting according to an equation $Iq'^* = I\,max^*\sin\theta$; and
   setting a d-axis current component $Id'^*$ of the target current after being performed the amplitude limiting according to an equation $Id'^* = I\,max^*\cos\theta$.

8. The motor control method according to claim 7, wherein when entering current amplitude limiting, a feedback torque is calculated, and the feedback torque is equal to 1.5 times of a product of pole pairs of the motor, a back electromotive force constant and the q-axis current component.

9. The motor control method according to claim 8, wherein the performing the amplitude limiting on the command torque to obtain the target torque comprises:
   comparing the feedback torque with a preset torque, determining a smaller one between the feedback torque and the preset torque as a maximum amplitude of the command torque, and setting the command torque after being performed the amplitude limiting as the target torque.

10. The motor control method according to claim 9, wherein the calculating the command torque based on the target speed and the feedback speed comprises:

calculating a difference between the target speed and the feedback speed, and calculating the command torque by a speed loop PI algorithm based on the difference and the target speed;

wherein the controlling the motor based on the current components of the target current after being performed the amplitude limiting comprises:

performing a current loop control based on the current components of the target current after being performed the amplitude limiting.

11. A motor control device comprising a computer storing computer-readable instructions thereon, wherein the computer-readable instructions, when being executed by the computer, cause the computer to:

perform an amplitude limiting on a command torque to obtain a target torque;

calculate a target current based on the target torque;

determine whether an amplitude of the target current is greater than a current limiting amplitude;

a current amplitude limiting module, configured to perform an amplitude limiting on current components of the target current, when the amplitude of the target current is greater than the current limiting amplitude; and a motor control module, configured to control a motor based on the current components of the target current after being performed the amplitude limiting, wherein the computer-readable instructions, when being executed by the computer, further cause the computer to:

calculate the current components of the target current based on the target torque;

calculate a total amount of the target current based on the current components of the target current; and determine whether an amplitude of the total amount of the target current is greater than the current limiting amplitude.

12. The motor control device according to claim 11, wherein the computer-readable instructions, when being executed by the computer, further cause the computer to:

obtain a target speed and a feedback speed; and calculate the command torque based on the target speed and the feedback speed.

13. The motor control device according to claim 12, wherein the current components of the target current comprise a d-axis current component and a q-axis current component, and the amplitude of the total amount of the target current is equal to a square root of a square sum of the d-axis current component and the q-axis current component;

the computer-readable instructions, when being executed by the computer, further cause the computer to:

determine whether the q-axis current component is greater than or equal to the current limiting amplitude; and set the q-axis current component to be equal to the current limiting amplitude, and set the d-axis current component to be equal to 0, when the q-axis current component is greater than or equal to the current limiting amplitude; and keep the q-axis current component unchanged, and set the d-axis current component to be equal to a square root of a square difference between the current limiting amplitude and the q-axis current component, when the q-axis current component is less than the current limiting amplitude;

alternatively, the computer-readable instructions, when being executed by the computer, further cause the computer to determine whether the d-axis current component is greater than or equal to the current limiting amplitude; and set the d-axis current component to be equal to the current limiting amplitude, and set the q-axis current component to be equal to 0, when the d-axis current component is greater than or equal to the current limiting amplitude; and keep the d-axis current component unchanged, and set the q-axis current component to be equal to a square root of a square difference between the current limiting amplitude and the d-axis current component, when the d-axis current component is less than the current limiting amplitude.

14. The motor control device according to claim 13, wherein the computer-readable instructions, when being executed by the computer, further cause the computer to:

calculate a feedback torque upon entering current amplitude limiting, wherein the feedback torque is equal to 1.5 times of a product of pole pairs of the motor, a back electromotive force constant and the q-axis current component;

compare the feedback torque with a preset torque, and determine a smaller one between the feedback torque and the preset torque as a maximum amplitude of the command torque;

calculate a difference between the target speed and the feedback speed, and calculate the command torque by a speed loop PI algorithm based on the difference and the target speed; and perform a current loop control based on the current components of the target current after being performed the amplitude limiting.

15. A variable frequency drive, configured to control a motor, wherein the variable frequency drive comprises the motor control device according to claim 13.

16. The motor control device according to claim 12, wherein the computer-readable instructions, when being executed by the computer, further cause the computer to:

calculate a component angle $\theta$ based on the target torque; and determine a q-axis current component $Iq'^*$ of the target current according to an equation $Iq'^* = I\ max^* \sin\theta$, when the amplitude of the total amount of the target current is greater than the current limiting amplitude; and determine a d-axis current component $Id'^*$ of the target current according to an equation $Id'^* = I\ max^* \cos\theta$, when the amplitude of the total amount of the target current is greater than the current limiting amplitude.

17. The motor control device according to claim 16, wherein the computer-readable instructions, when being executed by the computer, further cause the computer to:

calculate a feedback torque upon entering current amplitude limiting, wherein the feedback torque is equal to 1.5 times of a product of pole pairs of the motor, a back electromotive force constant and the q-axis current component;

compare the feedback torque with a preset torque, and determine a smaller one between the feedback torque and the preset torque as a maximum amplitude of the command torque;

the command torque calculation module is further configured to calculate a difference between the target speed and the feedback speed, and calculate the command torque by a speed loop PI algorithm based on the difference and the target speed; and perform a current loop control based on the current components of the target current after being performed the amplitude limiting.

18. The motor control device according to claim 12, wherein the computer-readable instructions, when being executed by the computer, further cause the computer to:

calculate a feedback torque upon entering current amplitude limiting, wherein the feedback torque is equal to 1.5 times of a product of pole pairs of the motor, a back electromotive force constant and the q-axis current component;

compare the feedback torque with a preset torque, and determine a smaller one between the feedback torque and the preset torque as a maximum amplitude of the command torque;

calculate a difference between the target speed and the feedback speed, and calculate the command torque by a speed loop PI algorithm based on the difference and the target speed; and perform a current loop control based on the current components of the target current after being performed the amplitude limiting.

19. A variable frequency drive, configured to control a motor, wherein the variable frequency drive comprises the motor control device according to claim 11.

* * * * *